United States Patent

Akhter

US005773113A

[11] Patent Number: 5,773,113
[45] Date of Patent: Jun. 30, 1998

[54] ADHESIVE COMPOSITIONS FOR ELECTRONIC APPLICATIONS

[75] Inventor: Sohail Akhter, Brown Deer, Wis.

[73] Assignee: Brady Precision Tape Co., Milwaukee, Wis.

[21] Appl. No.: 754,732

[22] Filed: Nov. 21, 1996

[51] Int. Cl.⁶ .......................... C09J 171/10; C09J 175/04
[52] U.S. Cl. .................. 428/41.8; 428/413; 428/423.1; 428/473.5; 428/480; 525/440; 525/453; 525/454; 525/456
[58] Field of Search ................................ 428/413, 423.1, 428/473.5, 480, 41.8; 525/453, 454, 456

[56] References Cited

U.S. PATENT DOCUMENTS

| | | | |
|---|---|---|---|
| 3,728,150 | 4/1973 | Yuan | 117/138.8 A |
| 3,822,175 | 7/1974 | Yuan | 161/93 |
| 3,900,662 | 8/1975 | Yuan | 428/252 |
| 4,264,669 | 4/1981 | Yuan | 428/209 |
| 4,347,286 | 8/1982 | Ishikzuka et al. | 428/349 |
| 4,977,003 | 12/1990 | Brown et al. | 428/35.5 |
| 5,271,964 | 12/1993 | Ohishi | 525/454 |
| 5,277,972 | 1/1994 | Sakumoto et al. | 428/355 |
| 5,317,067 | 5/1994 | Yagi | 525/454 |
| 5,494,757 | 2/1996 | Sakumoto et al. | 428/447 |
| 5,496,886 | 3/1996 | Courlias | 524/540 |
| 5,500,294 | 3/1996 | Sakumoto et al. | 428/355 |

FOREIGN PATENT DOCUMENTS

| | | |
|---|---|---|
| 59-172346 | 8/1984 | Japan . |
| 1891698 | 12/1994 | Japan . |

*Primary Examiner*—Patricia A. Short
*Attorney, Agent, or Firm*—Quarles & Brady

[57] ABSTRACT

Adhesive compositions for electronic applications contain a hydroxyl-bearing resin, a thermoplastic urethane and a curing agent.

3 Claims, No Drawings

ADHESIVE COMPOSITIONS FOR ELECTRONIC APPLICATIONS

CROSS REFERENCE TO RELATED APPLICATIONS

Not applicable

FEDERALLY SPONSORED RESEARCH

Not applicable

FIELD OF THE INVENTION

This invention relates generally to adhesive compositions. More specifically, the present invention relates to adhesive compositions that are particularly useful for electronic applications.

BACKGROUND OF THE INVENTION

Adhesive compositions are used in integrated circuit (IC) chip assembly for various bonding and holding functions. Major applications are in bonding of leads of a lead frame and in attaching metal heat spreader plates to ICs. When the adhesive composition is used as an unsupported free film or as a double sided tape where the adhesive composition is coated on both sides of a backing film, it is commonly referred to as Electronic Adhesive Film (EAF). The adhesive composition also can be used in the form of a single sided tape, where the adhesive composition is supported on one side of a backing film, for bonding the metal leads of a lead frame. Such tapes are commonly referred to as Lead Frame Tapes (LFT).

The requirements of a lead frame tape (LFT) are demanding. A lead frame is a perforated thin metal sheet composed of a central pad and leads (fingers) fanning out from all sides. The lead frame is typically made out of copper, alloys of copper or copper plated with noble metals like silver and palladium. The frame provides the skeleton of the assembly while the leads provide the connections between the IC chip and the printed circuit board (PCB) on which the IC chip is ultimately mounted. The number of leads fanning out of the lead frame can vary from a few to hundreds of leads. A typical standard frame has 40 lead pins.

In making a packaged integrated circuit chip an integrated circuit chip (IC chip) is first bonded to the central pad of the lead frame and then the input-output junctions (I/Os) on the chip are wire bonded to the metal leads extending out from the lead frame. The whole assembly is then encapsulated with an encapsulant.

Coplanarity of the metal leads is very important for accurate wire bonding and surface mount operations. These leads can be bent during shipping and handling which can cause problems during wire bonding of the chip to the leads and during mounting of the IC to the printed circuit board. The thinner the leads are, the more susceptible they are to mechanical damage.

In order to ensure the coplanarity of the leads, the leads are bonded to each other by a thin strip of lead frame tape, prior to encapsulation. The tape straddles all the leads on any one side of the frame and provides a mechanical linking of all the leads such that if any lead is forced to bend it will be restored back to its original coplanar position due to the spring action of the tape.

An adhesive composition used as an EAF film or as the adhesive on a lead frame tape must possess the following properties to be effective:

(1) It must readily bond to the metal leads and metal plates under heat and pressure. A standard sealing condition is 240° C. for 0.3 seconds, although a temperature ranging from 150°–300° C. and dwell ranging from 0.1–0.5 seconds may be utilized on a standard taping equipment like the Vanguard Autotape 700 taper.

(2) After bonding the tape must have sufficient adhesion to resist delamination under mechanical or thermal shock. Adhesion greater than 150 grams is desirable, preferably in the 200–300 gm range, on a standard 40 pin lead frame tape.

(3) The adhesive should have a fast cure (or crosslink) at the lowest temperature possible such that it does not impede productivity. A desirable cure temperature range is 200°–300° C. and a desirable cure time is less than 90 seconds, preferably 30–60 seconds.

(4) The adhesive, after curing, must have enough bonding power to withstand exposure to 250° C. for 5 minutes during wire bonding, without becoming so soft that it loses its adhesive bonding power.

(5) The adhesive must not chemically degrade or decompose during exposure to 250° C. during wire bonding operations.

(6) The adhesive should emit as little volatiles as possible during the bonding and assembly operations.

(7) The adhesive must not promote the growth of copper dendrites during voltage bias at normal or high temperatures and at normal or high humidities which ultimately can short out the leads and cause device failure.

(8) The leachable ionic contamination in the adhesive must be low in order to avoid charge leakage through the adhesive.

The EAFs and LFTs currently available on the market meet some of the above requirements but not all. Some have high adhesion to copper, but take a long time to cure. Some have low adhesion to copper and are susceptible to delamination in the event of mechanical shock. Some cure fast but only at a high temperature of 300° C. Some thermoplastic adhesive versions of the tape require no cure but they require sealing temperatures in excess of 300° C. and are quite expensive. Some are more susceptible to dendrite growth than others.

BRIEF SUMMARY OF THE INVENTION

It is an object of the present invention to disclose novel adhesive compositions for use in electronic applications, such as EAF films and LFT tapes.

It is a further object to disclose novel tapes including an adhesive composition of the present invention.

The present invention relates to unique adhesive compositions which can be used as either a free unsupported film (EAF) or in a double sided tape or a single sided tape (LFT).

The adhesive compositions of the present invention are heat sealable to metal leads and exhibit a fast cure time of 30 seconds at cure temperatures at and above 225° C. The adhesive compositions are heat stable and have high strength at elevated temperatures after cure. In addition, they do not promote copper dendrite growth during voltage bias.

The novel adhesive compositions of the present invention comprise the following ingredients:

(1) A hydroxyl-bearing resin, such as a phenoxy resin, an epoxy resin or a polyester resin;

(2) A thermoplastic urethane elastomer (TPU); and (3) A curing agent.

They also can include fillers and other additives, if desired.

When an adhesive composition of the present invention is supplied as an EAF film the film is supplied with one or two release liner films from which it can be easily separated. Any suitable release liner can be used as long as it releases easily and is non-contaminating.

When an adhesive composition of the present invention is used to form a tape, the adhesive composition is preferably coated on one or both sides of a polyimide backing film which provides support and high temperature resistance. Other films than polyimide film can be used as the backing as long as the adhesive composition sticks to it and the backing film meets the other thermal and chemical requirements. Release liners may be provided to protect the adhesive surface of the tape prior to use.

DETAILED DESCRIPTION OF THE INVENTION

The preferred adhesive compositions of the present invention are comprised of a phenoxy resin; a thermoplastic urethane elastomer (TPU), and a phenolic resole curing agent. The adhesive compositions may also contain fillers and other additives which may be electrically or thermally conductive.

The preferred phenoxy resin is a polymer of Bisphenol A repeat units which gives it high strength and high thermal resistance. Representative examples of commercially available phenoxy resins are: PAPHEN Phenoxy resins from Phenoxy Associates and EPONOL resins from Shell Chemical Company. The PAPHEN resins come in various molecular weights and the PKHH grade is the preferred resin.

The preferred phenoxy resins may be represented by the following formula:

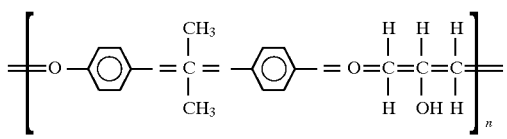

in which n is about 1 to 60 or more.

Other hydroxyl-bearing resins, such as epoxy resins containing hydroxyl groups and polyester resins containing hydroxyl groups, also can be used.

The preferred thermoplastic urethane elastomer (TPU) is one which provides the required tackiness to the adhesive. These elastomers are supplied with either polyester or polyether units in the polymer chain. Either kind is suitable as long as it is soluble in a suitable solvent, such as dioxolane, and it is compatible with the phenoxy resin. Representative examples include ESTANE resins from B.F. Goodrich Chemical Co., MORTHANE resins from Morton Chemical Co. and PEARLSTICK resins from Marquinsa Co. The Estane 5703 resin is the preferred TPU resin. Suitable TPU resins are disclosed in U.S. Pat. Nos. 2,871,218 and 2,899,411.

The preferred curing agent is a phenolic resin of the resole type. It provides the crosslinking and strengthening of the adhesive composition. The phenolic resoles typically react with the hydroxyl groups on the phenoxy resin to generate a crosslink site. There are a large number of suppliers of suitable resole resins. The resole resins which exhibit the fastest cure speeds are those which are alkylated. Especially preferred resol phenolic resins are bisphenol A type resins, alkylphenol resins, and co-condensed phenol resins which contain as the phenol component at least one member selected from the group consisting of bisphenol A, alkylphenols and phenol. Representative examples include BAKELITE resins from Georgia Pacific Resins, Inc., and phenolic coating resins from Schenectady International, Inc. The GPRI-7590 phenolic resin from Georgia Pacific is the preferred curing agent.

Other curing agents that provide suitable crosslinking, such as a cyanate ester of bisphenol A, also can be used.

If desired, fillers can be added to the adhesive to adjust the thermal expansion co-efficient or impart electrical or thermal conductivity. An oxide powder, such as silica, can be used to adjust the thermal expansion co-efficient. Metal powders or metal coated spheres can be used to impart electrical conductivity, and oxide powders, such as alumina, aluminum nitride and beryllium oxide, can be used to increase the thermal conductivity of the adhesive. The amount of filler usually will range from about 0.5 to about 80% by weight of the total weight of the adhesive.

The relative amounts of the components of the adhesive can be tailored to desired end properties and the amounts reported in the table below are illustrative. All ranges are in weight percentages based on total weight of the dry adhesive.

| Component | Useable range | Preferred range | Most preferred range |
|---|---|---|---|
| Phenoxy resin | 20–60 | 25–50 | 30–45 |
| Thermoplastic urethane | 20–60 | 25–50 | 30–50 |
| Curing agent | 5–50 | 10–40 | 15–35 |

When making a single or double sided tape, the adhesive composition is applied to the backing film by any convenient coating technique, such as by roll coating or slot-die coating, to a thickness of about 10–50 microns, dried and the backing film is slit to form a tape.

The present invention is further illustrated by the Examples.

EXAMPLE 1

Adhesive Composition

An adhesive composition was formulated from the following ingredients:

| | |
|---|---|
| Phenoxy resin (Paphen PKHH-Phenoxy Associates) | 36.67% |
| Thermoplastic (Estane 5703-BF Goodrich Co.) Urethane elastomer | 38.33% |
| Phenolic resin (GPRI-7590-Georgia Pacific) | 25.00% |

The above ingredients were mixed together in 1,3 dioxolane solvent to form a solution.

EXAMPLE 2

Preparation of a Lead Frame Tape

The adhesive composition of Example 1 was coated on one side of Kapton HN polyimide film (50 microns thick, from DuPont High Performance Films) to a thickness of 4 mils using a drawdown bar of appropriate clearance such that the final dried thickness of the coating was about 0.8 mils. The film was slit to form a tape. The resulting tape was applied to a 40 pin copper lead frame at 240° C. using a dwell time of 0.3 secs. and a pressure of 30 psi. Current leakage values were determined as described in U.S. Pat. No. 5,277,972.

The sealed tape had the following properties:

Adhesion at room temperature—256 gm
Minimum time required for cure at 225° C.—30 secs
Dendrite growth@18 volts, 24 hrs., 150° C.—None
Initial current leak value—$1\times10^{-13}$ or less
Current leak value after a pressure cooker test for 500 hours—$1\times10^{-10}$ or less.

The adhesive of the tape showed good adhesion to the leads, it had a very fast curing speed and it did not promote the growth of dendrites.

It will be readily apparent to those skilled in the art that the above examples are illustrative and considerable variations can be made by one skilled in the art without departing from the scope of the invention. Therefore, it is intended that the invention only be limited by the claims.

I claim:

1. An adhesive tape for electronic parts comprising (a) a base film and (b) an adhesive layer on at least one side of said film, said adhesive layer consisting essentially of about 20 to about 60% by weight of a phenoxy resin, about 20 to about 60% by weight of a thermoplastic urethane elastomer and about 5 to about 50% by weight of a phenolic resin curing agent.

2. A tape of claim 1 in which the base film is a heat resistant polyimide film.

3. A tape of claim 1 in which the base film is a release lining.

* * * * *